Patented Sept. 14, 1954

2,689,252

UNITED STATES PATENT OFFICE 2,689,252

HYDROCARBON SYNTHESIS AND CATALYST THEREFOR

Alfred Clark, Bartlesville, Okla., assignor to Phillips Petroleum Company, a corporation of Delaware No Drawing. Application November 28, 1949, Serial No. 129,870

8 Claims. (Cl. 260—449.6)

This invention relates to the synthesis of organic compounds by the hydrogenation of an oxide of carbon. In a specific aspect this invention relates to a process for the synthesis of normally liquid hydrocarbons and oxygenated derivatives thereof by the catalytic hydrogenation of carbon monoxide. In a more specific embodiment this invention relates to the hydrogenation of carbon monoxide wherein a novel catalyst for the reaction is employed. In another more specific embodiment this invention relates to a novel method for regenerating hydrocarbon synthesis catalysts.

In the synthesis of hydrocarbons and oxygenated derivatives thereof from carbon monoxide and hydrogen by the process now commonly known as the Fischer-Tropsch process, carbon monoxide-hydrogen mixtures are contacted with suitable catalysts, particularly iron-containing catalysts, at elevated temperatures and pressures to form a mixture of products including normally gaseous and normally liquid products as well as solid or waxy materials. The catalysts employed in the prior art are deactivated by the deposition thereon of waxy and/or carbonaceous deposits, thus necessitating reactivation of the catalysts by the removal of these deposits. The accumulation of the deposits on the catalyst causes the reaction temperature to increase, and as the depositions increase the reaction temperature becomes progressively more difficult to control. Removal of the depositions is necessary in order to control the temperature within the desired limits and to prevent the formation of "hot spots" in the reaction zone which lead to excessive methane and carbon formation and which decrease the active life of the catalyst. One method of removing such deposits is by flushing the wax-containing catalyst particles with a hydrogen-containing gas at an elevated temperature. The regeneration or wax removal process may be carried out by interrupting the synthesis reaction and passing hydrogen into contact with the catalyst particles. Regeneration may also be carried out in a chamber separate from the reaction zone. Catalyst is cycled to the regenerating chamber from the reaction zone either continuously or intermittently, and the necessary regeneration is effected with hydrogen gas.

It is an object of this invention to provide a novel manner for effecting a hydrocarbon synthesis process.

It is another object of this invention to effect a hydrocarbon synthesis process in a manner that the deposition of reaction products on the catalyst is inhibited.

It is another object of this invention to provide a novel catalyst for the synthesis of hydrocarbons and oxygenated derivatives thereof from carbon monoxide and hydrogen.

It is a further object of this invention to provide a novel process for the regeneration of hydrocarbon synthesis catalysts whose catalytic activity has been diminished by deposition of reaction products on the catalyst.

Further and additional objects and advantages of my invention will be readily apparent from the disclosure hereinafter.

I have found that the deposition of reaction products on iron hydrogenation catalysts can be inhibited by employing a nickel hydrogenation catalyst in a mechanical mixture with the iron catalyst. Thus, the catalyst that I employ for the hydrocarbon synthesis reaction may be regarded as a mechanical mixture of discrete particles of two separate and distinct catalysts, i. e. an iron hydrogenation catalyst and a nickel hydrogenation catalyst. In practicing my invention the accumulation of waxy reaction products on the catalyst particles is inhibited, and, as a consequence, the need for regenerating the catalyst by removal of the waxy reaction products is reduced or entirely eliminated.

Without placing any undue limitations upon my invention, I offer the following as a possible explanation of the theory of my invention. Nickel is a demethylation catalyst in addition to being a hydrogenation catalyst. The waxes that condense on the catalyst remain in the reactor for much longer periods of time than the bulk of the reactants and other reaction products which are in the vapor phase. I believe that the nickel catalyst promotes the successive demethylation of the condensed waxes preferentially until their boiling point is reduced to the point where they vaporize and leave the reactor in the reaction effluent.

The exact amount of nickel catalyst that is employed in mechanical mixture with the iron catalyst may vary over relatively wide limits. Sufficient nickel catalyst should be employed to inhibit the deposition of reaction products, and concentrations of 0.5 weight per cent nickel based on the total weight of catalyst mixture are effective. Even lower concentrations of nickel may be used depending upon the conditions at which the reaction is effected. Nickel is known to be an effective catalyst for the hydrogenation of carbon monoxide, and it may be admixed with an iron catalyst in any proportion, depending upon the desired product. Nickel catalysts tend to produce high yields of normally gaseous reaction products, and in processes where normally liquid reaction products, and particularly those boiling within the gasoline boiling range are desired, the concentration of nickel in the catalyst admixture should be maintained relatively low. For that reason I prefer to use nickel concentrations no higher than 5.0 weight per cent based on the total weight of catalyst mixture, but the use of higher concentrations is within the scope of my invention.

The nickel catalyst that I employ is a nickel hydrogenation catalyst, and it may be in the form of free nickel metal or it may be nickel metal deposited on an inert support, such as kieselguhr. In actual operation I prefer to employ a nickel catalyst containing from 50 to 80, and specifically 72, weight per cent nickel supported on kieselguhr, and the nickel catalyst may be added to the reaction system in any suitable manner. The nickel may be added to the synthesis reactor before the synthesis reaction is initiated or it may be introduced to the reactor at a subsequent time during the reaction. Actually, it should be added to the reactor before sufficient waxy products have deposited on the catalyst to cause agglomeration of the catalyst particles or excessive temperature increases which may be deleterious to the catalyst. The nickel may be added to the synthesis reaction either in the form of nickel or of compounds of nickel, such as nickel oxide, which, in a reducing atmosphere, produce metallic nickel. Alternatively, the nickel may be added to the system at a point where the iron catalyst is undergoing treatment with hydrogen. Iron catalysts for hydrocarbon syntheses are produced by the reduction of an iron oxide with hydrogen, and, if desired, the nickel, preferably but not necessarily in the form of the oxide, can be added to the process during this hydrogenation. Also, iron catalysts, deactivated by deposition of reaction products thereon, are regenerated by treatment with hydrogen, and, if desired, the nickel, preferably but not necessarily in the form of the oxide, can be added to the process during this regeneration step. When the nickel is added to the process in this manner it facilitates the regeneration of the deactivated iron catalyst. Consequently, it is within the scope of my invention that a nickel catalyst be employed to facilitate the regeneration of a deactivated iron catalyst with hydrogen. For this regeneration nickel concentrations greater than 5 weight per cent based on the total catalyst in the regenerator may be used, but higher concentrations are not necessary to effect the regeneration.

The iron catalysts for my process and their methods of preparation are known, and these catalysts may contain any of the known promoters, such as alkali metal oxides, alumina or calcium oxide. The catalyst mixture that I have disclosed herein may be employed either in a fluidized bed or in a fixed bed during the synthesis reaction. If a fluidized bed is used, the constant agitation and turbulence of the catalyst particles insure adequate mixing of the iron and nickel catalysts. When a fixed catalyst bed is employed, the particles of iron and nickel catalysts should be thoroughly and uniformly mixed prior to use in the synthesis reaction. Thorough mixing is necessary in order to inhibit the deposition of reaction products on the catalyst throughout the entire catalyst bed.

In the prior art iron and nickel have been used together in the same catalyst for the hydrogenation of carbon monoxide. For example, nickel oxide has been employed, along with other metallic oxides, as a promoter for iron catalysts. Also, catalysts have been prepared by fusing mixtures of iron and nickel or their oxides in the presence of oxygen and reducing the resulting fused product with hydrogen. Also, catalysts have been prepared by coprecipitating hydrous oxides of iron and nickel on a carrier or supporting material, such as kieselguhr. Similarly, catalysts have been prepared by depositing nickel on an iron catalyst by decomposition of nickel carbonyl in the presence of the iron catalyst. In contradistinction to these prior art catalysts where nickel and iron are employed in the same catalyst, my catalyst mixture is composed of two different catalysts, i. e., an iron hydrogenation catalyst and a nickel hydrogenation catalyst. Particles of the two catalysts are mixed mechanically, and the resulting mechanical mixture contains discrete particles of each of the two different catalysts. The above-named prior art catalysts are iron-containing catalysts within the scope of my invention, and in my process the discrete particles of a nickel-containing catalyst can be mechanically mixed with any of these prior art catalysts to inhibit reaction product deposition on the iron catalysts. In the specific examples hereinbelow the differences between my catalyst mixture and the prior art catalysts will be readily apparent along with the advantages to be gained from using my catalyst mixture.

The catalyst mixture that I have disclosed herein may be used to effect the hydrogenation of a carbon oxide at conditions normally employed for that reaction when an iron-containing catalyst is used. For example, when a fluidized bed of my catalyst is used, temperatures within the range of 550 to 700° F., pressures within the range of 50 to 700 pounds per square inch gauge, space velocities of 1,000 to 3,500 and higher volumes of reactants per volume of catalyst per hour, and molar ratios of hydrogen to carbon monoxide within the range of 1:1 to 3:1, preferably 2:1, are suitable for the reaction. When a fixed bed of catalyst is used, slightly lower temperatures and lower space velocities are employed.

As indicated above, my catalyst mixture contains discrete particles of two separate and distinct hydrogenation catalysts, and during the synthesis reaction these distinct catalysts act independent of each other. It is within the scope of my invention that particles of each of these catalysts may be bound together with a suitable binding material, such as a hydrogenated peanut oil, to form catalyst particles containing both the iron and the nickel catalysts. This type of catalyst is regarded as a mechanical mixture of discrete particles of two separate catalysts that act independent of each other. This type of catalyst must not be confused with the above-mentioned prior art catalysts which are not mechanical mixtures of more than one catalyst within the scope of my invention.

Also, as indicated above, the nickel catalyst, either in the form of nickel or as an oxide of nickel, can be added to the system while the iron catalyst is undergoing treatment with hydrogen. This introduction may be made while the iron catalyst is being prepared by the reduction of an iron oxide, such as $Fe_3O_4$. This introduction may also be made while the iron catalyst is being regenerated with a hydrogen-containing gas by removal of waxy reaction products from the catalyst. In one specific embodiment my invention encompasses regenerating an iron catalyst, that has been deactivated by waxy hydrocarbon synthesis products, by contacting the catalyst with a hydrogen-containing gas in the presence of a nickel hydrogenation catalyst. The temperature employed for this regeneration is usually somewhat higher than the synthesis reaction temperature, say at least 50° F. higher or within the range of 600 to 900° F., but synthesis reaction temperatures have been employed for this regeneration. Also, lower temperatures may be used, but the higher temperatures are preferred.

During the experimental work that I conducted with mixtures of iron and nickel hydrogenating catalysts I noted that the nickel catalysts tended to be elutriated from the synthesis reaction zone with the reaction effluent. In order that the concentration of nickel catalyst in the reaction zone can be maintained within the limits set forth above, provision should be made to replenish the nickel lost in this manner. Fresh nickel catalyst may be added to the synthesis reactor to replace such losses. The reactor may be provided with suitable mechanical means, such as fine mesh screens or cyclone separators, for removing nickel catalyst from the reaction effluent. Alternatively, the system may be provided with suitable means outside the reactor for separating nickel catalyst from the reaction effluent, and the thus-separated catalyst is then returned to the reactor. Any method of maintaining the nickel concentration sufficiently high to inhibit deposition of reaction products on the catalyst may be used.

From my disclosure it is apparent that I have invented a novel mechanical mixture of two hydrogenation catalysts, a method for employing this catalyst in the hydrogenation of carbon monoxide, and a novel method of regenerating an iron hydrogenation catalyst with a hydrogen-containing gas in the presence of a nickel hydrogenation catalyst.

The following examples are illustrative of my invention.

EXAMPLE I

A catalyst composed of iron, two per cent alumina and one-third per cent potassium oxide, prepared by electric fusion of $Fe_3O_4$ to which the above promoters had been added, was used in a fluidized bed to synthesize organic compounds from hydrogen and carbon monoxide. The temperature was 620° F., the pressure was 400 pounds per square inch gauge, the space velocity of fresh reactants was 3,000 volumes of reactants per volume of catalyst per hour, the recycle ratio of normally gaseous effluent to fresh feed was 3:1, and the molar ratio of hydrogen to carbon monoxide in the feed was 2:1. It was necessary to interrupt operation with this catalyst at intervals of 36 hours to remove wax from the catalyst by treatment with hydrogen at 800° F. To this iron catalyst was added two per cent by weight of a nickel catalyst in powdered form containing 72 weight per cent nickel and the remainder kieselguhr as a support. Operation at the above conditions was continued for 150 hours with no signs of catalyst fouling. Fouling of the catalyst in the absence of the added nickel catalyst was evidenced by erratic temperatures, excessive temperature rises, and virtually uncontrollable operation and ultimately complete agglomeration of the catalyst.

EXAMPLE II

In order to compare my catalyst mixture with prior art catalysts the experimental work set forth in this example was carried out.

Catalyst A was prepared by electric fusion of an iron oxide promoted with potassium oxide, alumina and calcium oxide followed by reduction at 930° F. with hydrogen at a space velocity of 1,000 volumes of hydrogen per hour per volume of catalyst.

Catalyst B was prepared by mechanically mixing with catalyst A 1.2 weight per cent nickel supported on kieselguhr in powdered form.

Catalyst C was prepared by adding 0.75 weight per cent nickel in the form of nickel oxide to catalyst A at the same time the other promoters were added prior to electric fusion.

Catalyst D was prepared by depositing 0.84 weight per cent nickel on catalyst A. Catalyst A was placed in a catalyst reduction chamber, and a stream of hydrogen was bubbled through a container of nickel carbonyl and then passed into the reduction chamber while a larger stream of hydrogen entered at another point to keep the catalyst fluidized. The catalyst temperature was held at 400° F. and the stream of hydrogen containing nickel carbonyl was passed through the catalyst until the desired amount of nickel was deposited on the catalyst, as determined by quantitative analysis.

Catalyst E was prepared by coprecipitating hydrous oxides of an iron oxide and nickel oxide. This catalyst was found to be unsatisfactory in a fluidized catalyst system because attrition losses were extremely high. Therefore, no comparison was made with the other catalysts, and no data are reported hereinbelow for this catalyst.

Each of the above catalysts was employed in a hydrocarbon synthesis system employing a bed of fluidized catalyst. For each catalyst the temperature was 610° F., the pressure was 400 pounds per square inch gauge, the space velocity was 3,500 volumes of fresh feed per volume of catalyst per hour, and the recycle ratio of normally gaseous effluent to fresh feed was 3.3:1. The fresh feed contained hydrogen and carbon monoxide in a molar ratio of 2:1. The settled bed depth was 2 feet, requiring 1,200 milliliters of settled catalyst, and the apparent linear velocity of gases through the catalyst bed was 0.66 feet per second. Hydrogen treatments of the catalysts, at 750° F. and atmospheric pressure, were used when temperature control of the catalyst became difficult.

As a result of this experimental work the following data were observed.

Table

| Catalyst | A | B | C | D |
|---|---|---|---|---|
| Operating Period, Hours | 94 | 98 | 90 | 44 |
| Conversion Data, Hours on Stream | 53 | 20 | 93 | 67 | 41 |
| Wt. Percent Nickel Added | 0 | 1.2 | | 0.75 | 0.84 |
| Wt. Percent Nickel at end of Operation | 0 | | 0.76 | 0.68 | 0.61 |
| API Gravity, Product condensed at 50° F | 58 | 62 | 62.5 | 60.5 | 59.5 |
| Hydrogen Treatment, Hrs. on Stream | 30, 65, 94 | None | None | 44, 77 | 26, 44 |
| Conversion of CO, Percent | 97 | 97 | 96 | 99 | 98 |
| Percent Reacted CO to: | | | | | |
| C₅+ | 54 | 54 | 49 | 54 | 51 |
| C₃+ | 74 | 75 | 70 | 76 | 71 |
| CO₂ | 5.9 | 9.0 | 11.0 | 5.1 | 8.1 |
| CH₄ | 6.9 | 7.2 | 5.8 | 6.6 | 9.9 |
| C₂ | 6.7 | 7.3 | 6.7 | 6.3 | 7.8 |
| C₃ | 11.1 | 10.6 | 11.2 | 11.8 | 10.1 |
| C₄ | 9.7 | 9.4 | 9.4 | 10.5 | 9.1 |
| C₅ to 400° F | 37.8 | 38.3 | 35.8 | 39.5 | 36.1 |
| 400 to 700° F | 8.7 | 10.6 | 9.5 | 9.6 | 10.7 |
| 700° F.+ | 7.0 | 5.5 | 4.0 | 4.3 | 4.6 |
| Oxygenated Compounds in aqueous phase | 4.8 | 3.6 | 3.8 | 4.5 | 4.5 |
| Acids in aqueous phase | 1.5 | 0.7 | 0.6 | 1.0 | 1.5 |
| Carbon on catalyst | 0.35 | | 0.08 | 0.28 | 0.51 |

In this table, C₅ to 400° F. indicates those reaction products containing at least five carbon atoms per molecule and boiling below 400° F. 400° F. to 700° F. indicates those reaction products boiling with the expressed range, and 700° F.+ indicates those reaction products boiling above 700° F.

From the data contained in the table it is quite obvious that my catalyst is superior to the known catalysts with which it was compared. During the operation it was unnecessary to treat my catalyst with hydrogen to remove deposited reaction products, but it was necessary to treat the other catalysts quite frequently with hydrogen. It should also be noted that the presence of the nickel in my catalyst tended to inhibit the deposition of carbon on the catalyst.

From the disclosure hereinabove modifications and variations of my invention will be apparent to those skilled in the art. However, it is believed that these modifications and variations are within the scope of my invention.

I claim:

1. In the synthesis of hydrocarbons and oxygenated derivatives thereof wherein carbon monoxide and hydrogen are reacted at an elevated temperature and pressure in the presence of a metallic iron hydrogenation catalyst fluidized in said carbon monoxide and hydrogen, the improvement which comprises employing with said iron hydrogenation catalyst in a mechanical mixture therewith separate and discrete particles of from 0.5 to 5.0 weight per cent of a metallic nickel hydrogenation catalyst.

2. An improvement according to claim 1 wherein the nickel hydrogenation catalyst is added to the iron hydrogenation catalyst during the synthesis reaction in the form of metallic nickel.

3. An improvement according to claim 1 wherein the nickel hydrogenation catalyst is added to the iron hydrogenation catalyst during the synthesis reaction in the form of metallic nickel on an inert supporting material.

4. In the synthesis of hydrocarbons and oxygenated derivatives thereof wherein carbon monoxide and hydrogen are reacted at an elevated temperature and pressure in the presence of a metallic iron hydrogenation catalyst fluidized in said carbon monoxide and hydrogen and wherein waxy reaction products deposit on said catalyst and are removed therefrom by contact with a hydrogen-containing gas at an elevated temperature, the improvement which comprises adding to said iron hydrogenation catalyst during treatment of said catalyst with a hydrogen-containing gas to remove waxy reaction products therefrom separate and discrete particles of nickel oxide to form a metallic nickel hydrogenation catalyst in the presence of said hydrogen-containing gas, the concentration of metallic nickel being between 0.5 and 5.0 weight per cent based on total weight of catalyst.

5. The method of removing from an iron hydrogenation catalyst waxy reaction products deposited thereon during the synthesis of organic compounds from hydrogen and carbon monoxide which comprises contacting said catalyst with a hydrogen-containing gas at an elevated temperature in the presence of separate and discrete particles of from 0.5 to 5.0 weight per cent of a metallic nickel hydrogenation catalyst.

6. A catalyst for the synthesis of organic compounds from hydrogen and carbon monoxide which comprises a metallic iron hydrogenation catalyst in a mechanical mixture with separate and discrete particles of from 0.5 to 5.0 weight per cent of a metallic nickel hydrogenation catalyst.

7. A catalyst according to claim 6 wherein the iron hydrogenation catalyst comprises metallic iron promoted with aluminum oxide, potassium oxide and calcium oxide and wherein the nickel hydrogenation catalyst comprises metallic nickel on an inert supporting material.

8. In the synthesis of hydrocarbons and oxygenated derivatives thereof wherein carbon monoxide and hydrogen are reacted at an elevated temperature and pressure in the presence of a metallic iron hydrogenation catalyst fluidized in said carbon monoxide and hydrogen, said iron hydrogenation catalyst being regenerated by contact with a hydrogen-containing gas at an elevated temperature, the improvement which comprises adding to said iron hydrogenation catalyst separate and discrete particles of a catalyst selected from the group consisting of nickel and nickel oxide, the concentration of metallic nickel being maintained between 0.5 and 5.0 weight per cent based on total weight of catalyst.

(References on following page)

References Cited in the file of this patent

UNITED STATES PATENTS

| Number | Name | Date |
|---|---|---|
| 2,159,367 | Bass et al. | May 23, 1939 |
| 2,296,405 | Scheuermann et al. | Sept. 22, 1942 |
| 2,467,861 | Scharmann | Apr. 19, 1949 |
| 2,486,243 | Atwell | Oct. 25, 1949 |
| 2,550,442 | Beck et al. | Apr. 24, 1951 |
| 2,553,433 | Vesterdal | May 15, 1951 |
| 2,583,254 | Clark | Jan. 22, 1952 |

FOREIGN PATENTS

| Number | Country | Date |
|---|---|---|
| 507,366 | Great Britain | June 14, 1939 |
| 534,357 | Great Britain | Mar. 5, 1941 |
| 536,843 | Great Britain | May 29, 1941 |